United States Patent Office 2,776,739
Patented Jan. 8, 1957

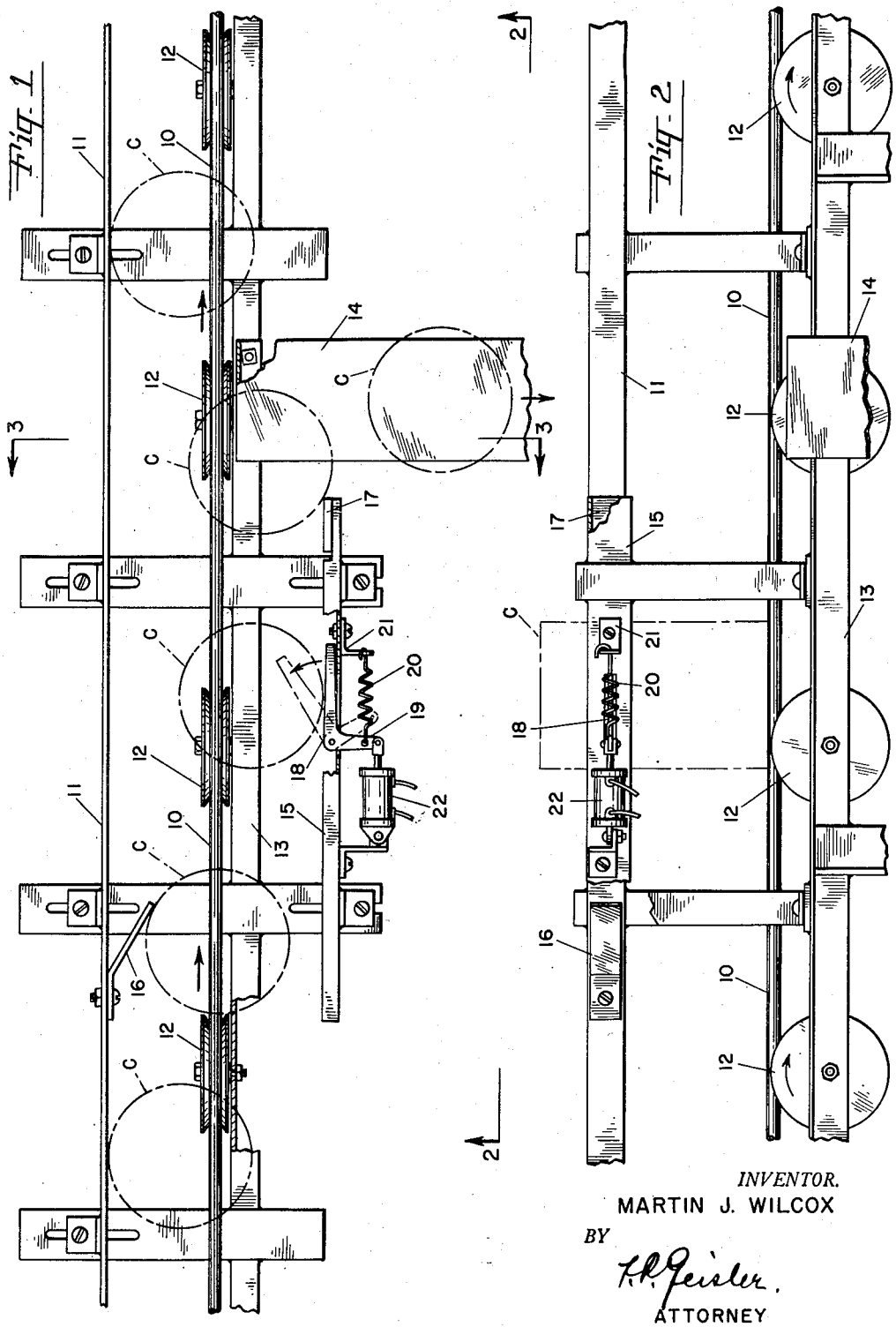

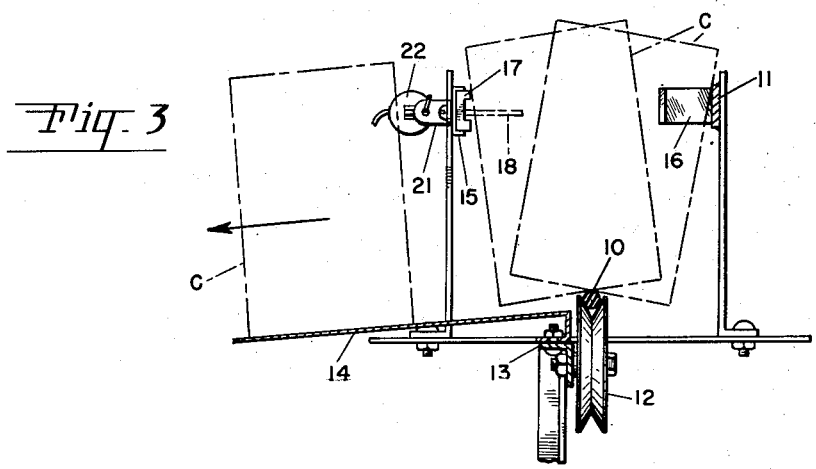

2,776,739

DIVERTING MEANS FOR CONVEYOR SYSTEM

Martin J. Wilcox, Portland, Oreg.

Application January 25, 1955, Serial No. 483,877

4 Claims. (Cl. 198—31)

This invention relates in general to conveyor systems of the type used for distributing such articles as containers and the like in a factory or packing plant, and, more specifically this invention relates to conveyors employed for the distribution of cans to particular locations in a cannery.

An object of the invention is to provide an improved and simplified means which may be set up at any desired location along the conveyor for the purpose of enabling some of the cans or containers selectively to be diverted from the conveyor in that location while permitting others to continue their travel on the conveyor.

Another object of the invention is to provide novel diverting means for cans on a conveyor which will function to cause cans to be withdrawn from the conveyor at a particular location as desired, without requiring the exercise of more than a minimum amount of effort or attention on the part of the operator stationed there.

An additional object is to provide diverting means of the type above indicated which will be inexpensive to make and to install and which will involve no maintenance problem.

These objects and incidental advantages I attain by a simple device in which use is made of a permanent magnetic element, as will be readily understood from the following brief description with reference to the accompanying drawings.

In the drawings:

Figure 1 is a fragmentary, more or less diagrammatic, plan view showing a portion of a very simple conveyor system for cans with my diverting means installed thereon;

Figure 2 is a corresponding side elevation taken on the line line 2—2 of.Figure 1; and Figure 3 is a transverse sectional elevation on line 3—3 of Figure 1.

The simplified conveyor system illustrated is one of the types of conveyors commonly used in canneries for conveying empty cans, and the conveyor comprises an endless cable or belt 10, on which the bottoms of the cans rest as they are moved along the conveyor assembly. The cans C, while resting on this cable 10, tip to one side against a side guard rail 11 which extends along the entire conveyor parallel to the cable 10. The cable 10 is supported on a succession of pulleys 12 mounted on suitable support such as a longitudinally extending main frame member 13 in the frame structure for the conveyor, and the side rail 11 is adjustably mounted on the frame structure and is spaced above and to one side of the cable 10 the proper distance, depending upon the size of the cans being employed in the factory.

At the place where some of the cans are to be diverted from the conveyor, a slide 14 is mounted, the top end of the slide being attached to the frame member 13 and the top surface of the slide being slightly below the top of the conveyor cable 10 where the slide is attached to the conveyor frame. The slide 14 slopes downwardly from the conveyor on the opposite side from the guard rail 11, as shown in Figure 1, and the slide 14 has sufficient downward slope so that a can, when placed on the slide and when pulled off of the cable 10, will move down the slide 14 by gravity. The slide 14 leads down to a platform or work table (not shown), or to another conveyor, as the case may be.

A short rail 15 is mounted on the frame structure of the conveyor assembly on the opposite side from the main rail 11 ahead of the slide 14 and thus in the relative position shown in Figure 1. This short additional rail 15 is spaced approximately the same distance from the conveyor cable as the main rail 11 and also is arranged at approximately the same height as the main rail 11.

A can engaging member 16 is attached to the main rail 11 opposite the beginning of the additional short rail 15, and this engaging member 16 extends out obliquely into the path of the moving cans for a short distance and acts to push the cans over sufficiently towards the opposite side to cause them to tip against the short rail 15.

A permanent magnet 17 is mounted at the termination of the short rail 15, and when a can, which has been tipped against the rail 15, is brought into contact with the magnet 17 as the can is moved along by the cable 10, the attraction exerted by the magnet on the can is sufficient to halt further forward travel of the can with the conveyor cable 10. In consequence the halted can turns in a clockwise direction (as viewed in Figure 1) and slides off of the cable 10. In so doing the can also frees itself from the magnet 17. Should the can fail to slide entirely off from the cable 10 or should the can fail to turn sufficiently to free itself from the magnet 17 the next can moving along the conveyor by engaging the first can will then thrust it further around until it is on the slide 14 entirely free from both cable and magnet. The freed can then moves down the slide 14 as desired.

In order to prevent all the cans on the conveyor from being diverted in this manner down the slide 14, a movable can-engageable member 18 is also mounted on the rail 15 a short distance ahead of the magnet 17. This can-engageable member 18 (as shown in Figure 1) is in the form of a bellcrank and is pivotally mounted in the rail 15, as shown, the rail having a slot to accommodate the pivoted bellcrank. The outer arm 19 of the bellcrank 18 is attached to the end of a tensioned coil spring 20, the other end of the coil spring being secured to a stationary bracket 21 mounted on the outside of the rail 15. The arm 19 of the bellcrank or can-engageable member 18 is also connected by suitable linkage to a solenoid 22, and when the solenoid 22 is energized it is capable of causing the bellcrank 18 to be pulled to the inactive or full line position shown in Figure 1 against the force of the spring 20. The solenoid 22 is connected to a suitable source of electric energy (not shown) and a push button control switch (also not shown) is provided in the circuit to the solenoid convenient to the location of the operator stationed near the slide 14. When the circuit to the solenoid is not closed, the member 18 is pulled by spring 20 into the can-engaging position as indicated by the broken lines in Figure 1. When the member 18 is in this engaging position each can, which has been previously tilted against the rail 15, encounters the member 18 and is pushed back to its original position against the rail 11 by the member 18, thus causing the can to avoid contact with the magnet 17 and thereby to continue its travel along the conveyor. However, when an operator, stationed near the slide 14, desires to have a can diverted from the conveyor, all that is necessary is for the operator to close the push button circuit to the solenoid, which, by causing the member 18 to be held in inactive position as long as the circuit to the solenoid is kept closed, will result in the cans being diverted from the slide 14 as described.

I claim:

1. In combination with a conveyor assembly for conveying metal objects susceptible to attraction by a magnet, a slide leading off from one side along said conveyor assembly, a stationary magnetic element located above said side of said conveyor assembly adjacent said slide, said magnetic element being capable of exerting sufficient attraction, when contacted by one of said objects on said conveyor assembly, to halt the forward movement of said object, and means selectively operable for producing physical contact between said magnetic element and a desired object moving along on said conveyor assembly as the object approaches said slide, whereby a desired object can be diverted from said conveyor assembly and onto said slide through the instrumentality of said means and said magnetic element.

2. In combination with a conveyor of the character described for conveying cans and the like, a downwardly inclined slide leading off from one side along said conveyor, a stationary permanent magnet located above said side of said conveyor assembly adjacent the top of said slide, said magnet being capable of exerting sufficient attraction, when contacted by a can on said conveyor, to halt the forward movement of said can, and means selectively operable for producing physical contact between said magnet and a desired can moving along on said conveyor as the can approaches the top of said slide, whereby a desired can can be diverted from said conveyor and onto said slide through the instrumentality of said means and said magnet.

3. In combination with a conveyor of the character described for conveying cans and the like and having a guide rail extending along and above one side of said conveyor, a can slide leading off from the opposite side along said conveyor, a guide rail located above and on said opposite side of said conveyor and terminating at said slide, a stationary magnet located at the termination of said latter mentioned guide rail, said magnet being capable of exerting sufficient attraction when contacted by a can on said conveyor to halt the forward movement of said can, means for engaging a can on said conveyor so as to push the engaged can from said first mentioned guide rail to said second mentioned guide rail to cause such can while moving along said second mentioned guide rail to come into contact with said magnet, whereby said magnet, by restraining the can from further travel along said conveyor, will cause the can to be turned onto said slide, and movable and selectively operable means for returning a can to said first mentioned guide rail before contact with said magnet.

4. In combination with a conveyor of the character described for conveying cans and the like and having a guide rail extending along and above one side of said conveyor, a can slide leading off from the opposite side along said conveyor, a guide rail located above and on said opposite side of said conveyor and terminating at said slide, a stationary magnet located at the termination of said latter mentioned guide rail, said magnet being capable of exerting sufficient attraction when contacted by a can on said conveyor to halt the forward movement of said can, means for pushing the cans on said conveyor successively from said first mentioned guide rail to said second mentioned guide rail to cause the cans while moving along said second mentioned guide rail to come into contact with said magnet, whereby said magnet, by restraining a contacted can from further travel along said conveyor, will cause the contacted can to be turned onto said slide, a movable can-engageable element, located ahead of said magnet, operable to push a can away from said second mentioned guide rail and back to said first mentioned guide rail to prevent a can from coming into contact with said magnet and being diverted from said conveyor, and means for selectively operating said can-engageable element.

References Cited in the file of this patent
UNITED STATES PATENTS

| | | |
|---|---|---|
| 2,264,348 | Weygant | Dec. 2, 1941 |
| 2,542,053 | Pechy | Feb. 20, 1951 |
| 2,630,903 | Currivan | Mar. 10, 1953 |
| 2,649,184 | Dodge | Aug. 18, 1953 |